United States Patent Office 2,698,780

Patented Jan. 4, 1955

2,698,780

METHOD OF TREATING GERMANIUM FOR TRANSLATING DEVICES

Ralph A. Logan, Morristown, and Morgan Sparks, Basking Ridge, N. J., assignors to Bell Telephone Laboratories, Incorporated, New York, N. Y., a corporation of New York No Drawing. Application February 3, 1953, Serial No. 334,972

8 Claims. (Cl. 41—42)

This invention relates to the fabrication of semiconductor signal translating devices and more particularly to the preparation of germanium material for use in such devices.

Germanium material is used in a variety of translating devices, for example in rectifiers such as disclosed in Patent 2,602,211, granted July 8, 1952, to J. H. Scaff and H. C. Theuerer, and in transistors such as disclosed in Patent 2,524,035, granted October 3, 1950, to J. Bardeen and W. H. Brattain, and Patent 2,569,347, granted September 25, 1951, to W. Shockley.

In the fabrication of such devices, it is desirable, and in some cases necessary, to employ treatments as a result of which the germanium material or a portion thereof is raised to a relatively high temperature, say of the order of 500° C. or higher. For example, such heating may occur in the formation of PN junctions by the so-called alloying process wherein a significant impurity, that is a donor or acceptor, is placed in contact with a body of germanium and the combination is flash heated to alloy the impurity with a portion of the body whereby a PN junction is formed. Such heating may occur also in the course of the electrical forming of a point contact in engagement with a germanium body. Also it may occur when the device is encapsulated in a plastic or vitreous material.

When germanium is subjected to a treatment which entails elevation of the temperature, the resistivity or conductivity type or both of the germanium may be altered substantially. It has been found, for example, that when a germanium body of N conductivity type is heated at about 500° C. or higher for even a brief time, a portion of the body may be converted toward or to P-type. Similar effects, may be noted in P-type material, i. e. the material may become more strongly P-type as a result of heating. These effects, of course, cause a marked alteration in the electrical characteristics of translating devices and heretofore have impeded the construction of some such devices to close performance tolerances.

The effect involved is ascribable to a factor now referred to in the art as thermium. The precise character of this factor is not fully understood. However, it is associated with the presence on the surface of the germanium material of certain elements, notably copper. The latter, it has been found, diffuses into germanium at a high rate, acts akin to an acceptor, and when present in even minute quantity on the surface of a germanium body can effect a substantial alteration or degradation in the electrical properties of the germanium when the body is heated.

One general object of this invention is to substantially eliminate thermium in the fabrication of germanium signal translating devices.

In accordance with one feature of this invention, a germanium body for use in signal translating devices is polished, as by abrasion followed by etching, and is then soaked in a solution which readily forms a soluble complex ion with copper. After this the body is washed.

In accordance with a specific feature of this invention, following the polishing treatment, the germanium body is soaked in a solution of a soluble cyanide such as potassium cyanide. A particularly advantageous characteristic of the latter is that the concentration of copper ions in equilibrium with the complex formed with cyanide is very low. Further, the complex ion is soluble and can be washed easily from the germanium.

In one illustrative embodiment of this invention, a wafer is cut from a single crystal of N conductivity type germanium of 40 ohm cm. resistivity, produced, for example, in the manner disclosed in the application Serial No. 138,354, filed January 13, 1950, of G. K. Teal. The faces of the wafer are lapped with 600 mesh silicon carbide and then blasted with the same abrasive, so that the major faces are flat and smooth. The dimensions of the finished wafer are about 0.280" x 0.280" x 0.050". Following this, the wafer is etched, as with an etchant consisting of 25 parts by weight nitric acid and 15 parts hydrofluoric acid, whereby the surfaces are polished. Various etchants may be employed and for different periods. Advantageously, for the particular one noted, the etching period is made such as to remove of the order of 0.005 inch from each surface of the wafer. After this the wafer is soaked in a solution of potassium cyanide, say of 5 grams potassium cyanide dissolved in 100 cc. of distilled water. The time of soaking may be about seven minutes. Finally, the wafer is washed with distilled water.

The effect of the potassium cyanide is indicated strikingly by measurements of specimens after heat treatment. Specifically, it has been established that wafers prepared as described in the preceding paragraph hereof when heated at 850° C. for one minute in hydrogen suffer no significant alteration in conductivity. The impurity centers introduced by the heat treatment were less than $10^{12}$ per cc. On the other hand, initially identical wafers treated in the same way except for the omission of the potassium cyanide step exhibited a marked change in resistivity when heated for one minute at 850° C. in hydrogen. Specifically, when a single etch with the nitric acid-hydrofluoric acid etchant for one minute was employed, it was found that $3.5 \times 10^{14}$ impurity centers per cc. were introduced by the heat treatment. This effected a change of the conductivity to about 2 ohm cm. P-type. When eight successive such etches, each of ten seconds duration and each followed by rinsing in distilled water were utilized, the heat treatment resulted in introduction of $10^{14}$ impurity centers per cc. with a change in the conductivity to about 6 ohm cm. P-type. Thus, it is evident that the potassium cyanide treatment results in a great reduction, by a factor of 10 or greater in the illustrative cases described above, in the impurity centers introduced into the germanium by heating at elevated temperatures.

It has been established that the cyanide treatment of the germanium results in no degradation of the performance characteristics of signal translating devices utilizing material thus treated. The potassium cyanide apparently does not attack the germanium itself.

Further, it has been established that the polishing step, i. e. the etching with nitric acid-hydrofluoric acid, is not essential to the attainment of a substantial reduction in the introduction of thermium into the germanium. However, its use is definitely advantageous. The etchant smooths the germanium surface and minimizes or eliminates the possibility of the formation of air pockets which would prevent complete wetting of the surface by the cyanide solution.

The concentration of the potassium cyanide solution appears to be not critical. As indicated hereinabove, a solution of 5 grams of the cyanide in 100 cc. of distilled water has been found satisfactory. Also the time of treatment may be varied between substantial limits. It appears that the major action of the cyanide in reducing thermium occurs early in the soaking step and substantial reduction in thermium is realized with treatments of substantially less deviation than the 7 minutes given in the example hereinabove.

Further, the solution may be utilized a number of times without diminution in its effectiveness. For example, the particular solution aforementioned has been used ten times in succession on different specimens with no significant diminution in its efficacy.

As has been noted previously herein, the exact nature of thermium is not entirely understood although it may be ascribed to minute quantities of impurities, notably copper, on the surfaces of the germanium body. The marked reduction hereinabove indicated in thermium through the use of potassium cyanide in acordance with this invention is consistent with the view that the presence of copper on germanium is conductive to thermium effects. The concentration of copper ions in equilibrium with the complex formed with cyanide is very low. Further, the complex ion is soluble in water and, hence, can be washed easily from the germanium surface.

It may be noted also, that the cyanide solution dissolves not only metallic copper but all copper compounds. In addition, the cyanide also would remove, by complexing, zinc, nickel, cobalt, manganese, cadmium and iron, all of which may be significant in connection with the introduction of thermium into germanium.

Although the invention has been described with particular reference to potassium cyanide, other cyanides may be used. Illustrative of such is sodium cyanide. Also, materials other than cyanides may be employed although potassium cyanide has been found particularly efficacious. Illustrative of such other materials are dimethyl glyoxime or tartrates. In general, the principal requirements are that the material be essentially free of copper, that it form a complex with copper wherein the concentration of copper ions is low, and that the complex formed be soluble in a common solvent such as water.

As noted hereinabove, although the polishing step is not essential, it is advantageous to realize the maximum reduction in thermium. Other etchants than the nitric acid-hydrofluoric acid described may be employed for the polishing. Illustrative of such others are those disclosed in Patent 2,542,727, granted February 20, 1951, to H. C. Theuerer.

What is claimed is:

1. The method of preparing a body of germanium for use in a signal translating device which comprises treating a surface of the body in a solution of potassium cyanide.

2. The method of preparing a body of germanium for use in a signal translating device which comprises abrading a surface of the body, soaking said surface with a solution containing potassium cyanide, and then washing said surface.

3. The method of preparing a body of germanium for use in a signal translating device which comprises etching a surface of the body with a mixture of nitric and hydrofluoric acids, soaking said body in a solution of potassium cyanide, and then washing said body.

4. The method of preparing a body of germanium for use in a signal translating device which comprises etching said surface with a mixture of nitric and hydrofluoric acids, soaking said surface in an aqueous solution of potassium cyanide, and then washing said surface.

5. The method of preparing a body of germanium for use in a signal translating device which comprises soaking a surface of the body with an aqueous solution of an essentially copper free solution of a cyanide.

6. The method of preparing a body of germanium for use in a signal translating device which comprises chemically polishing a surface of the body, treating said surface with an aqueous cyanide solution, and then washing said surface.

7. The method of preparing a body of germanium for use in a signal translating device which comprises abrading a surface of the body, chemically polishing said surface, applying an aqueous cyanide solution to said surface, and then washing the surface.

8. The method of preparing a germanium body for use in a signal translating device which comprises abrading a surface of the body, etching said surface with a mixture of about 25 parts nitric acid and 15 parts hydrofluoric acid, soaking said surface in an aqueous solution of potassium cyanide, and then washing said surface.

References Cited in the file of this patent

UNITED STATES PATENTS

| | | |
|---|---|---|
| 2,227,827 | Dubar | Jan. 7, 1941 |
| 2,560,594 | Pearson | July 17, 1951 |
| 2,588,008 | Jones et al. | Mar. 4, 1952 |
| 2,619,414 | Heidenreich | Nov. 25, 1952 |